US008925394B2

(12) United States Patent
Weingartner

(10) Patent No.: US 8,925,394 B2
(45) Date of Patent: Jan. 6, 2015

(54) SUPPORT ASSEMBLY FOR AN INK-JET PRINTING DEVICE

(75) Inventor: Peter Weingartner, Dölsach (AT)

(73) Assignee: Durst Phototechnik Digital Technology GmbH (AT)

( * ) Notice: Subject to any disclaimer, the term of this patent is extended or adjusted under 35 U.S.C. 154(b) by 345 days.

(21) Appl. No.: 13/395,970

(22) PCT Filed: Sep. 14, 2010

(86) PCT No.: PCT/AT2010/000334

§ 371 (c)(1), (2), (4) Date: May 29, 2012

(87) PCT Pub. No.: WO2011/032194

PCT Pub. Date: Mar. 24, 2011

(65) Prior Publication Data

US 2012/0227516 A1 Sep. 13, 2012

(30) Foreign Application Priority Data

Sep. 15, 2009 (AT) ................................ A 1456/2009

(51) Int. Cl.

*G01L 1/22* (2006.01)
*B41J 19/00* (2006.01)
*B41J 19/20* (2006.01)

(52) U.S. Cl.

CPC . *B41J 19/00* (2013.01); *B41J 19/20* (2013.01)
USPC .................................................... 73/862.627

(58) Field of Classification Search

USPC .................................................... 73/862.627
See application file for complete search history.

(56) References Cited

U.S. PATENT DOCUMENTS

| | | | | |
|---|---|---|---|---|
| 4,392,757 | A | 7/1983 | Denny et al. | |
| 4,916,466 | A | 4/1990 | Coste | |
| 6,379,064 | B1 | 4/2002 | Giles et al. | |
| 6,595,615 | B2 * | 7/2003 | Ylitalo | 347/19 |
| 7,175,354 | B2 * | 2/2007 | Niimi et al. | 400/48 |
| 8,622,639 | B2 * | 1/2014 | Weingartner | 400/354 |

(Continued)

FOREIGN PATENT DOCUMENTS

| | | | |
|---|---|---|---|
| DE | 602005002613 | T2 | 7/2008 |
| EP | 1029697 | A1 | 8/2000 |
| EP | 1721753 | A2 | 11/2006 |
| EP | 2000316 | A1 | 12/2008 |

OTHER PUBLICATIONS

International Search Report for PCT/AT2010/000334 dated Mar. 23, 2011.

*Primary Examiner* — Lisa Caputo
*Assistant Examiner* — Octavia D. Hollington
(74) *Attorney, Agent, or Firm* — Lerner, David, Littenberg, Krumholz & Mentlik, LLP

(57) ABSTRACT

The invention relates to a support assembly (1) for an ink-jet printing device, comprising a support (3) with a guide track (2), which runs in the longitudinal direction of said support, for a moveable unit that travels along said guide track (2). A supporting element (4), which like-wise extends in the longitudinal direction, is associated with the support (3) of the support assembly (1) and the ends (10, 11) of said support element (4) are supported on the support (3) against the effective gravitational direction. In addition, the support (3) and the supporting element (4) are tensioned with respect to one another along their longitudinal extension by means of at least one adjusting element (13).

19 Claims, 3 Drawing Sheets

(56) References Cited

U.S. PATENT DOCUMENTS

| | | | |
|---|---|---|---|
| 2003/0039500 | A1 | 2/2003 | Kelley et al. |
| 2006/0133880 | A1 | 6/2006 | Goeree et al. |
| 2009/0001243 | A1 | 1/2009 | Weingartner |
| 2009/0051715 | A1 | 2/2009 | Verhoest et al. |

* cited by examiner

SUPPORT ASSEMBLY FOR AN INK-JET PRINTING DEVICE

CROSS-REFERENCE TO RELATED APPLICATIONS

The present application is a national phase entry under 35 U.S.C. §371 of International Application No. PCT/AT2010/000334, filed Sep. 14, 2010, published in German, which claims priority from Austrian Patent Application No. A1456/2009, filed Sep. 15, 2009, all of which are incorporated herein by reference.

BACKGROUND OF THE INVENTION

The invention relates to a support assembly for an ink-jet printing device as it is described in claim 1.

A method for producing a support of this kind as well as such a support have been known from the EP 2 000 316 A1 of the same applicant. In this case, the walls of the support are formed by combining top belt modules, bottom belt modules, front wall modules and rear wall modules that are assembled one after another in the longitudinal direction of the support. In the interior of the support, transverse webs are provided, spaced at distances apart from one another. Furthermore, at least one guide track is provided on the support extending in its longitudinal direction for a unit mounted so that it can move along the guide track. In order to obtain a high precision of the guide tracks, the latter are formed by machining regions of the modules to remove material after the modules and transverse webs have been assembled. Though it was possible to improve the guiding precision between the print head carriage and the support, a satisfying constant distance between the nozzle outlets and the surface of the object to print on could not be achieved.

The underlying objective of the present invention is to create a support assembly for guiding a print head carriage of a ink-jet printing device, which has a compact design and during the printing process allows a nearly constant distance across the entire longitudinal extension of the support assembly between the mostly planar surface of the object to print on and the frontal end of the print head with the nozzles arranged there.

This objective of the invention is achieved by features according to claim 1. The advantage gained as a result of the features in claim 1 resides in the fact that the possibility is created to deform the additional supporting element with respect to the supporter in such a way that the latter is orientated in its mostly horizontal position, in a straight-lined way and thus without deflection under load, also in the event of being stressed by the unit, such as the print head carriage, that can travel along the guide track. Due to the fact that the support element at its two ends is supported in a load-bearing way with respect to the support, the desired pre-stress with respect to one another can be such increased by means of the adjusting element that the rectilinearity can be maintained across the entire longitudinal extension of the supporter, also in the event of highest stress. Thus, a parallel guiding with respect to the printing table or the object to print on lying thereon can be maintained also with larger distances between the bearing places of the supporter. Due to the nearly or complete elimination of the sagging of the supporter where the print head carriage is guided at, a constant distance between the nozzles dispensing the fluid printing medium and the surface of the object to print on is maintained across the entire adjustment way of the print head carriage. As a result, a proper print quality of the printed image produced by the inkjet-printing device is achieved.

Also of advantage is another embodiment according to claim 2, because thereby a cross-section of a support is created, which itself already provides a certain rigidity, in particular in case of rectangular embodied hollow bodies. Similarly, a perfect longitudinal guide along the guide track can also be achieved.

Also of advantage is an embodiment according to claim 3, because thereby an adjustment to different operational conditions for guiding the print head carriage can easily be created.

Due to the embodiment according to claim 4 it is possible to detect the existing deflection under load and the thereto related deviation from the rectilinearity of the support. Due to the corresponding pre-adjustment or the adjustment of the adjusting elements, the extent of the pre-tensioning with respect to one another between the support and the supporting element can be adjusted and set.

According to another variant of embodiment according to claim 5 it is possible to quickly react automatically to different deflections under load and to compensate the latter thereby as quickly as possible. Additionally, possibly appearing vibrations of the support assembly by modifying the mutual pre-tensioning between support and supporting element can also be decreased or compensated thereby.

Also of advantage is an embodiment according to claim 6, because a statically relatively stiff support having a low self-weight at a high stability against deflection under load is thereby also created.

In case of an embodiment according to claim 7 it is of advantage that across nearly the entire longitudinal extension of the support, an compensation of the deflection under load or the sagging can take place. Furthermore, also the supporting power can be transferred from the supporting element, directly via the support to the machine frame of the inkjet-printing device and no additional bending load of the support across its longitudinal extension results.

Due to the further embodiment according to claim 8 it is achieved that a sufficient deformation between the support and the supporting element is allowed, with the result that also a higher extent of deflection under load of the support can be compensated.

Due to the embodiment according to claim 9, a vertical tensioning of support and supporting element respective to one another can be achieved and thus, the deflection under load caused by the influence of the self-weight or the weight of the print head carriage can be counteracted.

Also of advantage is an embodiment according to claim 10, because thus the most compact dimensions for the support will be sufficient. Additionally, the possibility is created to accordingly retrofit existing supports without requiring additional alteration works in the region of the guide tracks.

Finally, also an embodiment according to claim 11 is possible, because thus, the most diverse operating conditions can easily be considered and the most advantageous respective adjusting element can be provided for different users.

The invention will be explained in more detail below with reference to examples of embodiments illustrated in the appended drawings.

BRIEF DESCRIPTION OF THE DRAWINGS

The heavily simplified schematics show.

DETAILED DESCRIPTION

Figure 1:
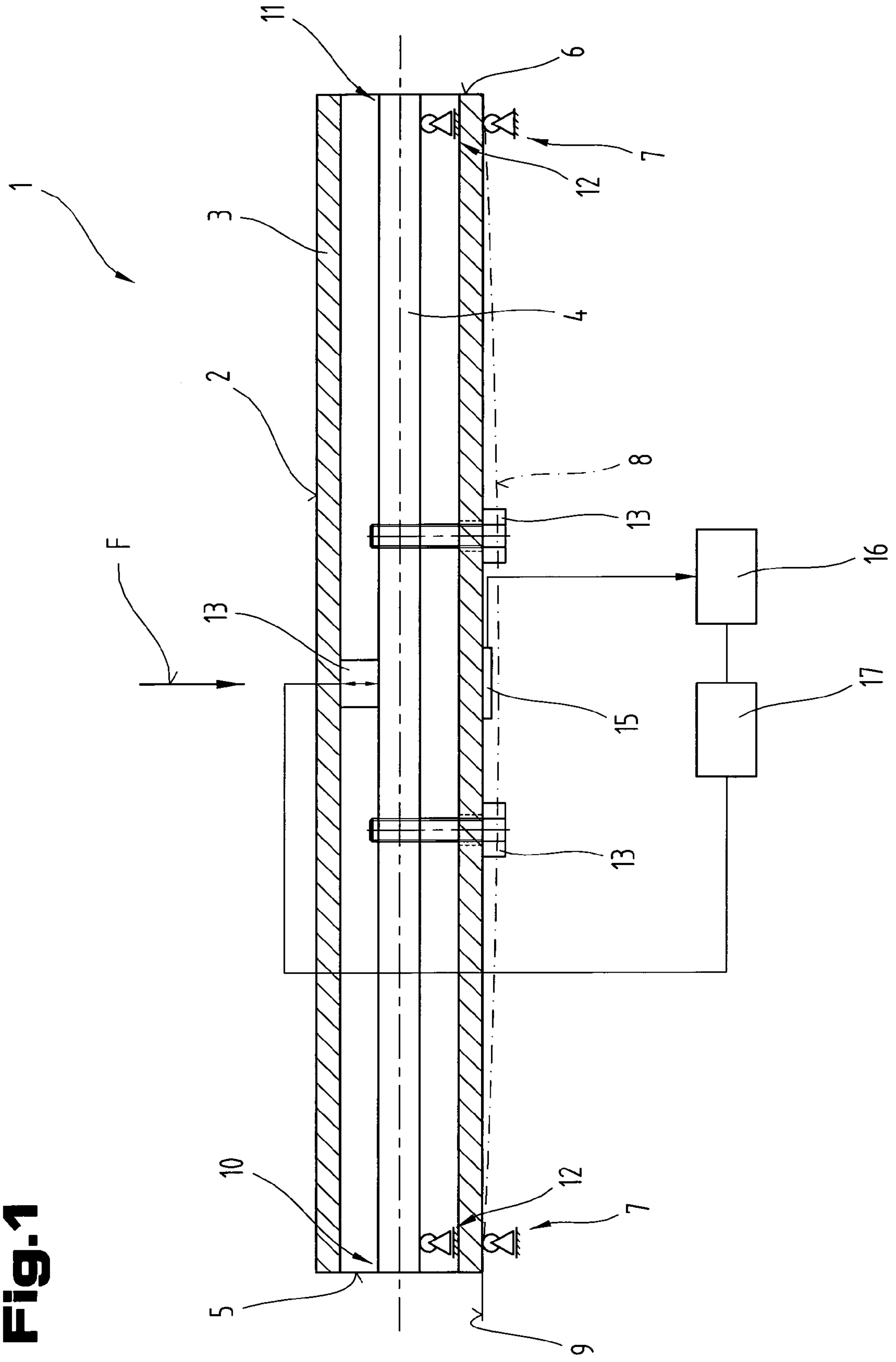
FIG. 1 a support assembly embodied according to the invention in sectional view and theoretical rectilinear orientation without deflection under load.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 2:
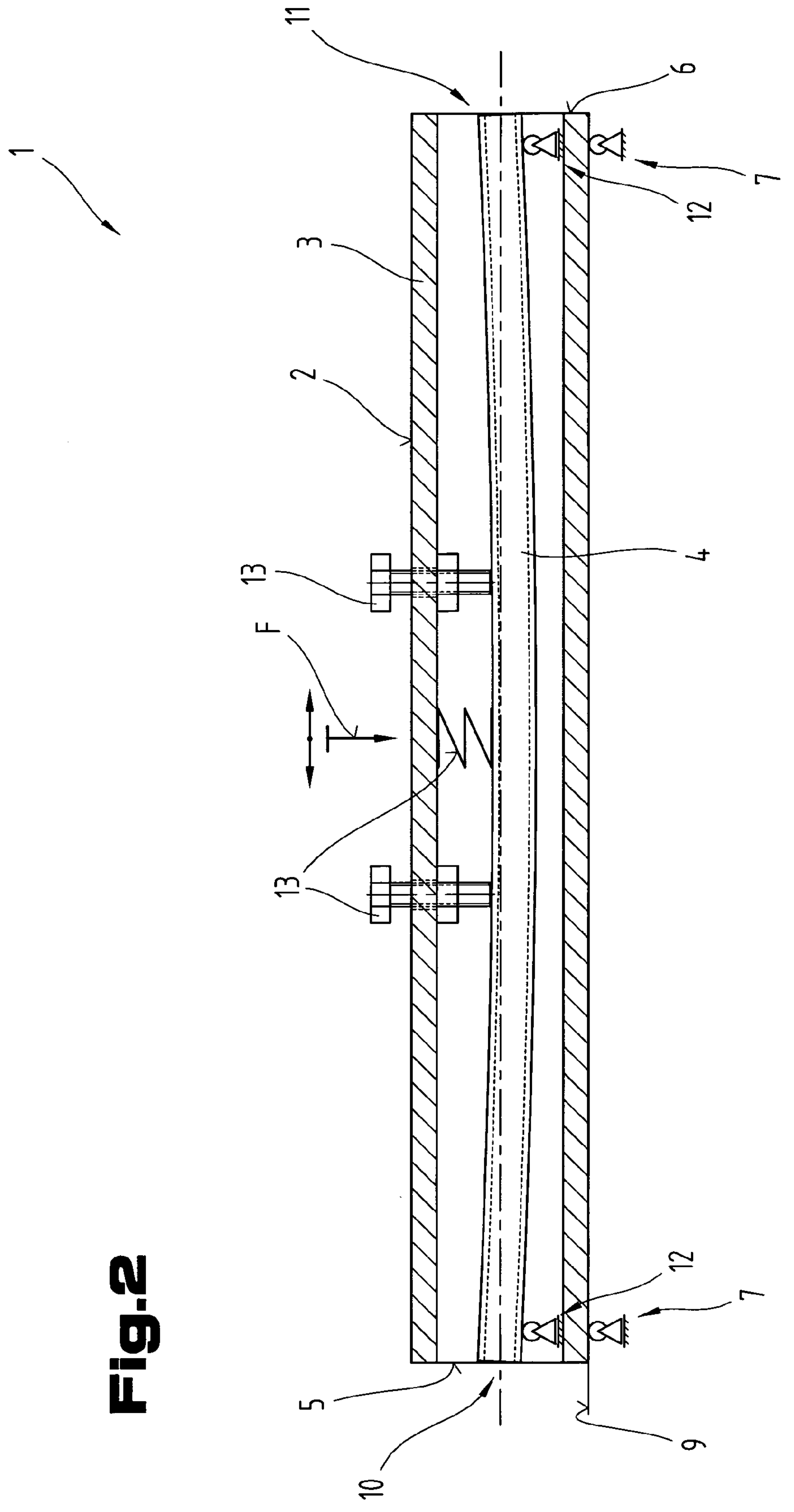
FIG. 2 the support assembly according to FIG. 1 in a mutually tensioned position of support and supporting element, in sectional view.
Figure 3:
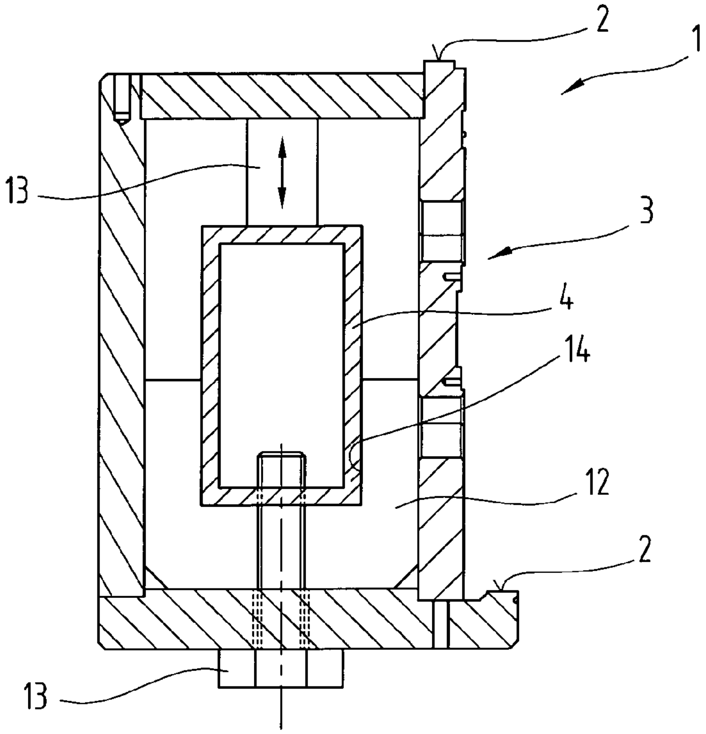
FIG. 3 the support assembly according to FIG. 1, in sectional side view.

In the FIGS. 1 to 3, a support assembly 1 for an ink-jet printing device, not shown in detail here, is illustrated and the support assembly 1 has at least one guide track 2 in its longitudinal direction or longitudinal extension. Along said guide track 2, a, here also not shown in detail moveable unit, for example a print head carriage with the thereto arranged printing facilities, nozzles etc., is moved in a guided way.

In particular with large-format ink-jet printing devices, the unit moveably guided at the support assembly has a considerable self-weight and the free and not supported longitudinal extension of the support assembly 1 has a size which is not inconsiderable, too. Because the performance of a proper printing process during the application of the fluid printing medium requires a nearly constant distance between the nozzles delivering the medium and a mostly planar embodied surface, it has been possible to achieve this only by a massive additional reinforcement of the support assembly 1 at the outer face of the latter. This frequently results in special problems with respect to the unit not shown in detail and thereto moveably, adjustably guided unit.

In the exemplary embodiment shown here, the support assembly 1 comprises at least one support 3 having a longitudinal extension as well as at least one bar-shaped supporting element 4, also extending in longitudinal direction of the support 3. In the region of its ends 5, 6 being spaced apart from one another in longitudinal direction, the support is supported by or connected to the base frame or the supporting frame of the ink-jet printing device via bearings 7, here schematically shown. The supporting or the bearing of the support 3 can in this case e.g. be effected by a moveable bearing in the region of the end 5 and a fixed bearing in the region of the end 6. Thus, in terms of static or engineering, a mostly horizontally extending bar, which is slim and slender with respect to its length and which transfers the bearing loads to walls or perpendicular supporting stands. The two bearings 7 thus support the bar or the support 3 at two places being spaced from one another, with the result that a support bears on two supporting stands.

In FIG. 1, furthermore a bending line 8 is entered in dash-dotted lines, which represents the deflection under load of the support 3 in a heavily overstated way. This bending line 8 does not only result from the self-weight of the support 3 but also from the unit previously having been moveably guided thereon.

Between its two bearings 7, the support 3 is shown in a theoretically ideal position and a rectilinear or planar reference plane 9 is spanned between the two bearings 7. Normally, the latter is orientated horizontally. Due to the deflection under load of the support 3, the largest deflection and thus deviation of the support 3 from the reference plane 9 is effected in the middle between the two bearings 7. The supporting element 4 for designing the support assembly 1 also extends in longitudinal direction of the support 3 and, in longitudinal extension of the latter, also has ends 10, 11 being spaced apart from one another. In the case of this exemplary embodiment shown here, the two ends 10, 11 have approximately the same distance to each other as the ends 5, 6 of the support 3. Thus, the support 3 and the supporting element 4 have at least approximately the same longitudinal extension. In the regions of its ends 10, 11, the supporting element 4 is supported on the support relative towards the latter against the effective gravitational direction. The forces that affect the different masses due to gravitation can also be referred to as so-called gravity. This supporting is here effected by bearing 12 and for example two moveable bearings can be found to be sufficient in this case. It would nevertheless also be possible to provide a moveable bearing and a fixed bearing again.

For reducing or neutralizing the sagging of the support assembly 1 with respect to the reference plane 9, as it is shown by means of the bending line 8, the support 3 and the supporting element 4 are here additionally tensioned with respect to one another along their longitudinal extension by means of at least one adjusting element 13. The adjusting element(s) 13 can also be referred to as adjusting means. This mutually tensioned position of the support 3 with respect to the supporting element 4 can best be taken from in FIG. 2. Approximately in the middle between the two bearings 7 of the support 3, an arrow "F" shows in a simplified way the weight caused by the moveable unit as well as the dead weight or the self-weight or the support 3. The deflection under load of the support 3 caused by the entire weight F is minimized or completely compensated by the adjusting element(s) 13. In order to tension the support 3 cooperating with the adjusting elements 13 with the supporting element 4 with respect to one another, the supporting element 4 is, in cross-sectional view, arranged at a distance from the wall section of the support 3, at least seen in the effective gravitational direction. The adjusting element(s) 13 can be chosen from a group of component parts like adjusting screws, pressure springs, tension springs, cylinder-piston arrangements etc. Also any combination of various adjusting elements 13 is possible. In this case, it can be of advantage if individual adjusting elements 13 build up a compressive force and further of the adjusting elements 13 build up a pulling force between the support 3 and the supporting element 4 and the latter are applied together. Similarly, the adjusting element(s) 13 can be arranged at any positions in longitudinal direction of the support assembly 1 as well as between the support 3 and the supporting element 4.

In FIG. 1 e.g., a first adjusting element 13 is arranged approximately at a midway point between the two bearings 7 on the side above the supporting element 4 and the wall section of the support 3. Additional adjusting elements are arranged at distances therefrom in the direction towards the two ends 5, 6 and are for example embodied as screws. The two adjusting elements 13 embodied as screws in this case act from the bottom side of the support 3 towards the direction of the supporting element 4. In the event that such adjusting elements 13 in the form of screws are chosen, appropriate through holes have to be provided at the bottom wall section of the support 3 and an appropriate screw thread arrangement has to be provided in the supporting element 4. The depiction of additional screw thread extensions in the region of the supporting element 4 was waived for reasons of better clarity, but they can in particular be used or provided with hollow profiles that are designed in a thin-walled way. In this case, e.g. screw nuts or threaded cubes can be used.

Due to the deformation of the supporting element 4, the entire support 3 can thus be lift up so far by tightening the screws, that the support 3 is at least adjusted in a planar way with respect to the reference plane 9. This planar orientation with respect to the reference plane 9, shall be adjusted or pre-adjusted in the event that the largest weight is introduced or applied to the support assembly 1 by the moveable unit at the support assembly 1. It can in this case also appear that the support 3 is deformed against the effective gravitational direction—i.e. upwardly—pre-deformed when the weight introduced by the moveable unit, e.g. the print head carriage, is withdrawn. Only when it is appropriately loaded with the weight of the moveable unit, the planar or rectilinear orientation of the support 3 with respect to the reference plane 9 is effected. Thus, a constant distance between the ends of the nozzle openings and the surface to print on is maintained, also during the reciprocating movement of the print head carriage. The deformation of the supporting element 4 due to the mutual tensioning shall be within the elastic range of the material used therefore.

The adjusting element 13, which is here shown in FIG. 1 and which is positioned at center with respect to the entire longitudinal extension, can for example be embodied as a springy pressure element and effect the tension of the support 3 and the supporting element 4 with respect to one another in cooperation with the adjusting elements 13 embodied as screws.

In FIG. 2, on the other hand, the springily working adjusting element 13 is provided in the middle of the longitudinal extension between the two bearings 7. In contrast to FIG. 1, the two adjusting elements 13 embodied as screws are also designed for establishing an effect of pressure for a mutual tensioning of the support 4 with the supporting element 4. Due to the local distance of the support element 4 with respect to the wall section of the support 3, the latter can easily be such deformed in the effective gravitational direction that the previously described rectilinearity or planarity of the support 3 with respect to the reference plane 9 can be effected.

A possible cross-section of a support assembly 1 is shown in a simplified way in FIG. 3. The support 3 can in this case for example be composed of different kinds of modules, as it was already described in the own EP 2 000 316 A1. In order to avoid unnecessary repetitions, regarding the detailed embodiment of the modular support 3 it is referred to the disclosure made there and this disclosure is included into the present application. Thus, the support 3 can be made of top belt modules, bottom belt modules, front wall modules and rear wall modules. The bearing 12, here embodied as a moveable bearing for supporting the supporting element 4 at the support 3 is in this case e.g. designed as a rib or a bar. For lateral supporting of the support element 4 relative with respect to the support 3, the bearing 12 embodied as a rib or a bar can have a recess 14.

Depending on the relative arrangement of the unit that is moveably guided at the support 3 of the support assembly 1 and the thereto related application of the weight, the mutual tensioning of the support 3 and the support element with respect to one another has to be selected correspondingly. With a force of action mostly being orientated vertically or in effective gravitational direction of the unit, the support 3 and the supporting element 4 are tensioned with respect to one another by the adjusting element(s) 13 at least viewed in effective gravitational direction. In case of a normal application, it can also be referred to as a mutual vertical supporting. Additionally thereto or independently thereof it would also be possible to tension the support 3 relative with respect to the supporting element 4 against each other also in a direction orientated perpendicularly with respect to the effective gravitational direction.

It has turned out to be particularly advantageous if the support 3 is for example embodied as a prismatic hollow body. The supporting element 4 can for example be designed as a prismatic hollow body, too. Rectangular cross-sections of pipes have turned out to be particularly preferable. Also support elements 4 that are embodied in a different way can be applied, too. It would thus be possible to use ropes that are heavily pre-stressed and that are in connection with the support 3 via retaining elements. This could be effected in the form of a support assembly as it is used for the overhead wires of the railway or for supporting structures in the field of bridge construction.

As it can be seen here, for reasons of space, it is advantageous if the supporting element 4 with its cross-section is arranged within an outer envelope of the support 3. If the support 3 is embodied as a prismatic hollow body, the bar-shaped supporting element 4 can be arranged within the clear space of the support 3. In order to provide or create sufficient adjusting range, appropriate dimensional coordination concerning the two components has to be taken into consideration. Due to said arrangement of the supporting element 4 within the support 4, for example existing supports can be retrofitted therewith without requiring additional modifications in the region of the guide track 2 or the print head carriage, representing the moveable unit, arranged thereto.

For calculating the deflection under load or the sagging of the support 3 it is also possible to provide or arrange a strain gauge 15 at the latter. Thus, it would e.g. be possible to detect the deflection under load of the support at the point of time of the highest load caused by the weight of the moveable unit and to tension the support 3 relative regarding the supporting element 4 against each other in a manual adjusting process in such a way, that the rectilinear or planar orientation of the support 3 with respect to the reference plane 9 is achieved.

It would, regardless of the above, also be possible to provide one or several adjusting elements 13 and to detect the current sagging of the support 3 by means of a strain gauge 15 and to transfer this value to a detecting device 16, which is shown in FIG. 1 in a simplified way. In case of a line link, the detected value can then e.g. be transmitted from the detecting means 16 to a control device 17. The latter calculates a control value and generates a corresponding control signal and transmits the latter to the adjusting element(s) 13, if applicable by interconnecting pressure generators, adjusting tools or suchlike not shown in detail here. For this purpose, the control device 17 is connected with the adjusting element(s) 13 by line link and effects an appropriate adjustment of the adjusting element 13 in order to achieve the rectilinearity or planarity of the support 3 with respect to the reference plane 9. In this case, it can be referred to as an active adjustment of the mutually tensioned components, i.e. the support 3 and the supporting element 4, which works depending on the weight applied.

Figure 4:
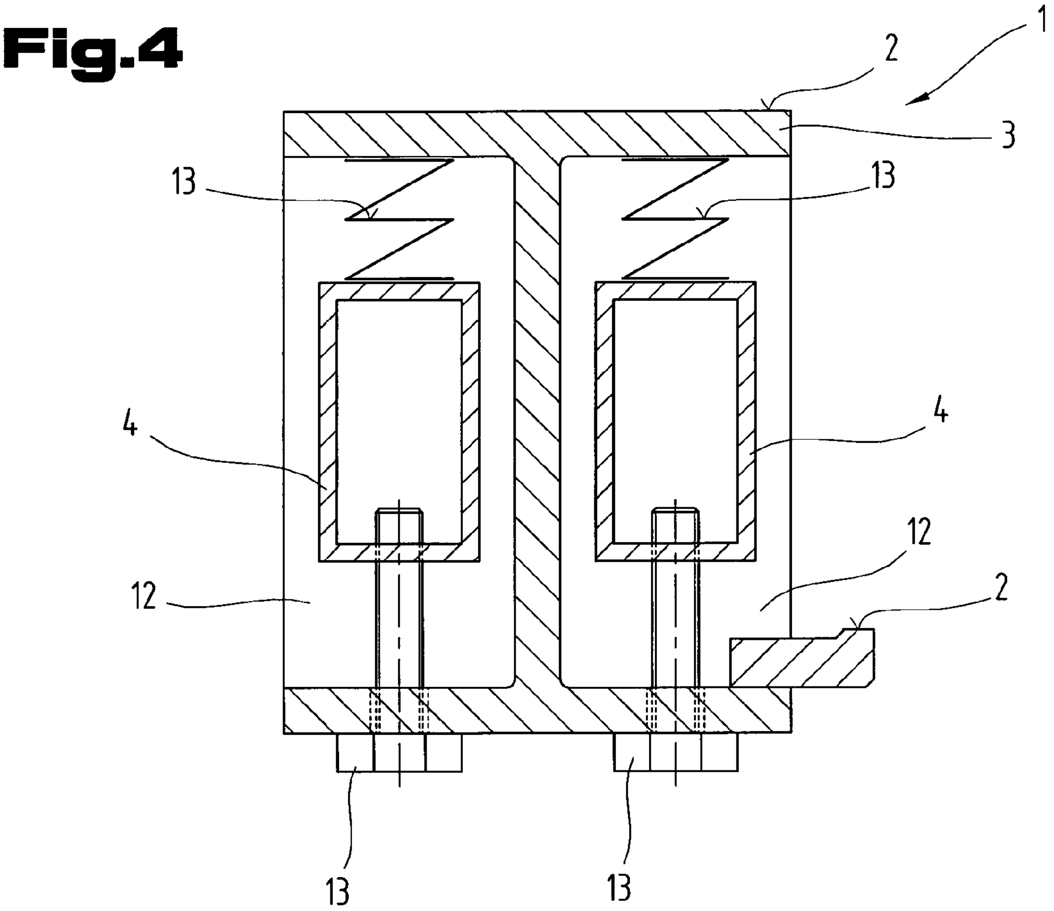
FIG. 4 another possible embodiment of a support assembly, in sectional side view.

In FIG. 4, another and probably independent embodiment of the support assembly 1 is shown and the same parts described are again denoted by the same reference numbers as in the preceding FIGS. 1 to 3. In order to avoid unnecessary repetitions it is referred to the detailed descriptions in the preceding FIGS. 1 to 3.

Thus, in this case, another possible form of cross-section of the support 3 is shown with the latter having an I-shaped cross-section. Depending on the support 3 chosen and the thereto related space offered it is for example possible to arrange or provide one own respective supporting element 4 on both sides of the bar. In the region of the ends 10, 11 of the supporting elements 4, bearings 12 which support the supporting element 4 relative with respect to the support 3 are arranged at the support 3. In the present embodiment, they are embodied as ribs, which can have a corresponding retaining recess for the supporting element 4.

The adjusting elements 13 are associated with the supporting elements 4 and here, viewed in the effective gravitational direction, the adjusting elements 13 above the supporting elements 4 are embodied as pressure elements and the adjusting elements 13 arranged below the supporting elements 4 are embodied as screws, which can establish a puling force between the flange of the supporter 3 and the supporting element 4. Instead of the screws embodied as pulling elements, also pull-springs or suchlike can be used.

The embodiments illustrated as examples represent possible design variants of the support assembly, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the support, it and its constituent parts are illustrated to a certain extent out of scale and/or on an enlarged scale and/or on a reduced scale.

The problem addressed by the independent solutions according to the invention can be taken from the description.

Mainly the individual embodiments shown in FIGS. 1, 2, 3; 4 can form the subject matter of independent solutions according to the invention. The objectives and solutions according to the invention relating hereto can be taken from detailed descriptions of these figures.

The invention claimed is:

1. A support assembly for an ink-jet printing device, comprising:

- at least one support with a guide track which runs in the longitudinal direction of said support for a moveable unit that travels along the said guide track;
- a supporting element which likewise extends in the longitudinal direction associated with the support of the support assembly, and ends of the supporting element are supported on the support against the effective gravitational direction; and
- at least one adjusting element arranged to effect an additional tension of the support and the supporting element with respect to one another along their longitudinal direction, in order to exert a force in a direction of action oriented perpendicular relative to the longitudinal direction of the support.

2. The support assembly according to claim 1, wherein the support is comprises as a prismatic hollow body.

3. The support assembly according to claim 1, wherein the support comprises an I-shaped cross-section.

4. The support assembly according to claim 3, further comprising a strain gauge for detecting the deflection under load of the support.

5. The support assembly according to claim 4, further comprising detecting means connected to the strain gauge via a line connection, and a control device arranged to receive information from the detecting means, and the control device is connected with the adjusting element via a line link.

6. The support assembly according to claim 3, wherein the supporting element comprises a prismatic hollow body.

7. The support assembly according to claim 3, wherein the support and the supporting element have at least approximately the same longitudinal extension.

8. The support assembly according to claim 3, wherein the support element, in cross-sectional view, is arranged at a distance from wall sections of the support at least in effective gravitational direction.

9. The support assembly according to claim 3, wherein the support and the supporting element are tensioned with respect to one another at least in effective gravitational direction.

10. The support assembly according to claim 3, wherein the cross-section of the supporting element is arranged within an outer envelope of the support.

11. The support assembly according to claim 3, wherein the adjusting element is selected from the group consisting of adjusting screws, pressure springs, tension springs, cylinder-piston arrangements.

12. The support assembly according to claim 1, further comprising a strain gauge for detecting the deflection under load of the support.

13. The support assembly according to claim 12, further comprising detecting means connected to the strain gauge via a line connection, and a control device arranged to receive information from the detecting means, and the control device is connected with the adjusting element via a line link.

14. The support assembly according to claim 1, wherein the supporting element comprises a prismatic hollow body.

15. The support assembly according to claim 1, wherein the support and the supporting element have at least approximately the same longitudinal extension.

16. The support assembly according to claim 1, wherein the support element, in cross-sectional view, is arranged at a distance from the wall sections of the support at least in effective gravitational direction.

17. The support assembly according to claim 1, wherein the support and the supporting element are tensioned with respect to one another at least in effective gravitational direction.

18. The support assembly according to claim 1, wherein the cross-section of the supporting element is arranged within an outer envelope of the support.

19. The support assembly according to claim 1, wherein the adjusting element is selected from the group consisting of adjusting screws, pressure springs, tension springs, cylinder-piston arrangements.

* * * * *